US011714240B2

(12) United States Patent
Hu et al.

(10) Patent No.: US 11,714,240 B2
(45) Date of Patent: Aug. 1, 2023

(54) ON-CHIP OPTICAL SWITCH BASED ON AN ECHELLE GRATING

(71) Applicant: SiLC Technologies, Inc., Monrovia, CA (US)

(72) Inventors: Shuren Hu, Arcadia, CA (US); Amir Hanjani, Cincinnati, OH (US); Chen Chen, Arcadia, CA (US); Mehdi Asghari, La Canada Flintridge, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 0 days.

(21) Appl. No.: 17/899,596

(22) Filed: Aug. 30, 2022

(65) Prior Publication Data

US 2022/0413224 A1 Dec. 29, 2022

Related U.S. Application Data

(62) Division of application No. 17/145,312, filed on Jan. 9, 2021, now Pat. No. 11,460,642.

(51) Int. Cl.
*G02B 6/34* (2006.01)
*G02B 6/35* (2006.01)

(52) U.S. Cl.
CPC ............. *G02B 6/34* (2013.01); *G02B 6/3548* (2013.01)

(58) Field of Classification Search
CPC .... G02B 6/34; G02B 6/3548; G02B 6/29308; G02B 6/29326
See application file for complete search history.

(56) References Cited

U.S. PATENT DOCUMENTS 9,176,282 B2 * 11/2015 Pottier .................. G02B 6/124

* cited by examiner

*Primary Examiner* — John Bedtelyon
(74) *Attorney, Agent, or Firm* — Gavrilovich, Dodd & Lindsey LLP

(57) ABSTRACT

An on-chip optical switch based on an echelle grating and a phase tuning element is described herein. The phase tuning element may change a refractive index of the material through which an optical signal propagates, thereby causing a change in the angle of propagation of the optical signal. By dynamically tuning the phase change element, the refractive index change may be controlled such that the deviation of the optical signal causes the optical signal to be focused on a particular coupling waveguide out of an array of coupling waveguides. The echelle grating with the active phase change element form a configurable optical switch capable of switching an optical signal between two or more coupling waveguides, that may be respectively connected to different optical signal processing pathways.

11 Claims, 12 Drawing Sheets

ON-CHIP OPTICAL SWITCH BASED ON AN ECHELLE GRATING

RELATED APPLICATIONS

This application is a divisional of U.S. patent application Ser. No. 17/145,312, filed on May 31, 2022, entitled On-Chip Optical Switch Based on an Echelle Grating, and incorporated herein in its entirety.

FIELD

This invention relates to on-chip optical switching and beam steering in photonic integrated circuits. In particular, the invention relates to on-chip echelle gratings.

BACKGROUND

On-chip optical switching is increasingly important for a range of emerging applications that incorporate integrated optical signal processing and optoelectronics. For example, light detection and ranging (LiDAR) systems, augmented reality (AR) and virtual reality (VR) systems, data communication systems, and other machine vision systems may incorporate on-chip optical switching for reducing form factors, improving system performance, and lowering costs. The more widely used architecture in integrated photonics for on-chip optical switching relies on cascaded Mach-Zehnder interferometers (MZI) with active phase tuning elements corresponding to each MZI. This optical switching scheme generally occupies a larger form factor and consumes greater power due to requiring a larger number of active phase tuning elements.

Echelle gratings have traditionally been used for optical signal multiplexing and demultiplexing applications but are not as widely used because they may be more sensitive to fabrication process related variations that could cause unpredictable phase variations and thus, impact performance. However, integrated photonic circuits that are based on a large waveguide silicon photonic platform (e.g., waveguide width≥1 μm) may offset the detrimental effects of such variations. LIDAR systems and other emerging applications related to machine vision and AR/VR may benefit from such large waveguide platforms that use Echelle gratings for not only the more traditional optical multiplexing and/or demultiplexing schemes, but also for on-chip optical switching applications. By incorporating an active phase tuning element into a traditional echelle grating design, it may be possible to achieve highly efficient optical switching in a compact form factor with lower power consumption as compared to the MZI-based optical switching scheme. LIDAR systems and other emerging applications related to machine vision and AR/VR systems may benefit from an echelle grating based on-chip optical switch that provides seamless integration with other on-chip opto-electronic components and can be fabricated using the same semiconductor process technologies.

SUMMARY

This summary is not intended to identify critical or essential features of the disclosures herein, but instead merely summarizes certain features and variations thereof. Other details and features will also be described in the sections that follow.

Some of the features described herein relate to on-chip optical switching using echelle gratings with an active phase tuning element. For example, the active phase tuning element may be positioned along the direction of propagation of an incoming optical signal and between an input waveguide carrying the optical signal and the echelle grating in the lateral direction but offset in the vertical direction. The active phase tuning element may be positioned on top of the silicon layer that includes the waveguide, the echelle grating, and/or other integrated optoelectronic components. In some instances, the active phase tuning element may be comprised of a titanium nitride (TiN) heating element. The phase tuning element may be generally serpentine in shape. In some instances, the phase tuning element may be based on a geometrical shape, such as a prism.

In some embodiments, the input waveguide and the echelle grating may be positioned along a circumference of a circle referred to as a Rowland circle, such that a facet of the waveguide roughly faces the reflecting surface of the echelle grating. One or more waveguides configured to couple the optical signal reflected-off the echelle grating back into the on-chip photonic circuit may be positioned along the same circumference of the Rowland circle. The input waveguide, the echelle grating, and the one or more coupling waveguides may be positioned within a common planar silicon layer. In some instances, the input waveguide, the echelle grating, and the one or more coupling waveguides may be centered along a horizontal plane with approximately no vertical offset.

In some embodiments, the phase tuning element may be based on a semi-circular shape that mirrors the circumference of the Rowland circle. The echelle grating may be associated with a grating radius, $R_g$, that is approximately twice the radius of the Rowland circle. The waveguides may be based on a large waveguide platform that provide greater immunity to process related variations in the fabrication of the echelle grating based on-chip optical switch. By dynamically controlling the phase tuning element, the echelle grating may function as an optical switch that can direct an optical signal of a particular wavelength to one of the coupling waveguides, effectively routing the signal to a chosen optical path like a switch.

BRIEF DESCRIPTION OF THE DRAWINGS

Some features herein are illustrated by way of example, and not by way of limitation, in the figures of the accompanying drawings and in which like reference numerals refer to similar elements.

FIG. 11 shows a schematic illustration of an on-chip optical switch connected to a LiDAR chip in accordance with various embodiments described herein.

DETAILED DESCRIPTION

Figure 1:
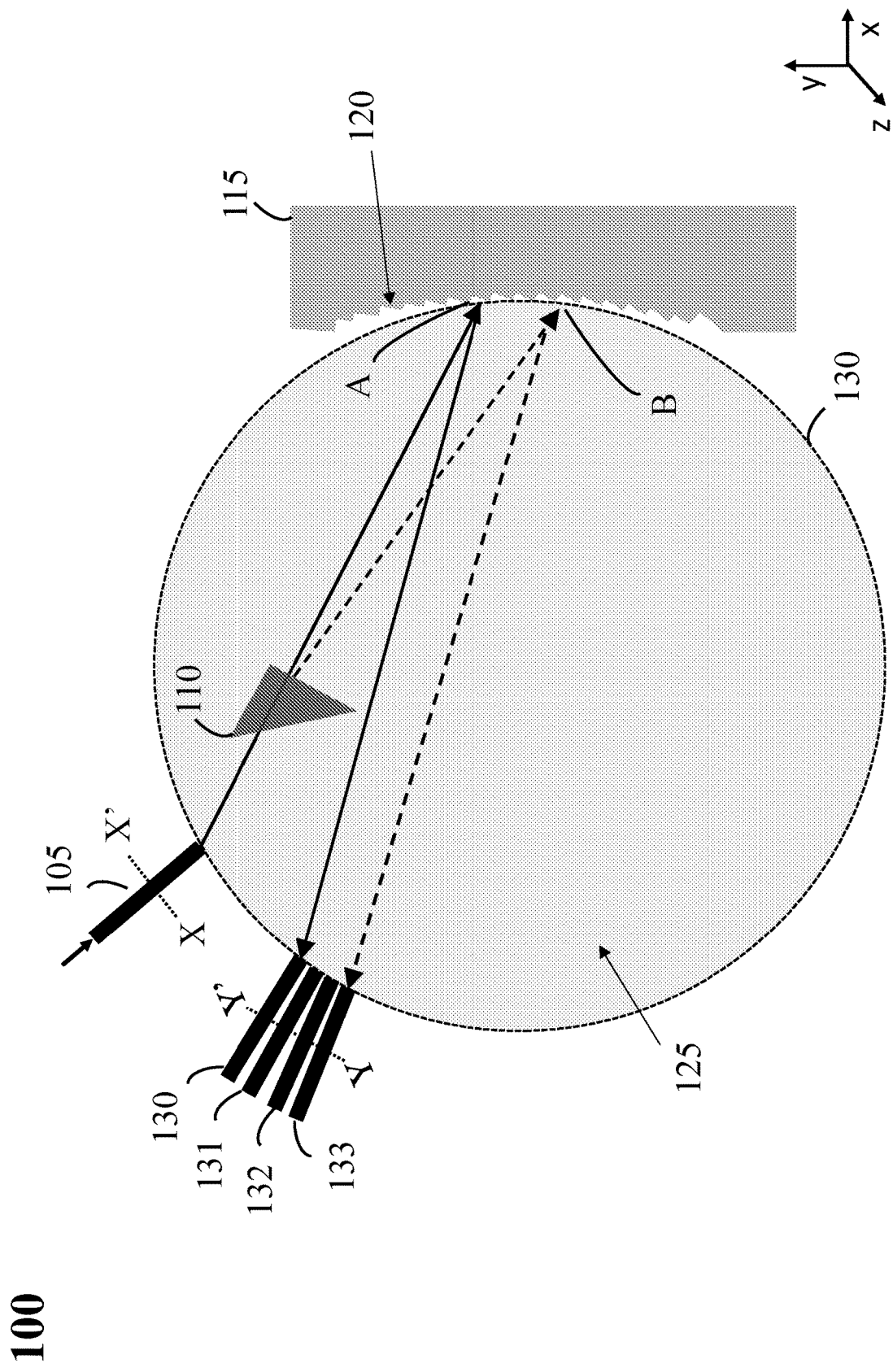
FIG. 1 shows a top-view schematic illustration of an on-chip optical switch based on an echelle grating and a phase tuning element in accordance with various embodiments described herein.

Example embodiments will now be described more fully with reference to the accompanying drawings. Many alternate forms may be embodied, and example embodiments should not be construed as limited to example embodiments set forth herein. In the drawings, like reference numerals refer to like elements.

As used herein, the term "and/or" includes any and all combinations of one or more of the associated items. Unless specifically stated otherwise, or as is apparent from the discussion, terms such as "processing" or "computing" or "calculating" or "determining" or "displaying" or the like, refer to the action and processes of a computing system, or similar electronic computing device, that manipulates, and transforms data represented as physical, electronic quantities within the computing system's registers and memories into other data similarly represented as physical quantities within the computing system's memories or registers or other such information storage, transmission or display devices.

Electronics and other processing elements may include one or more digital signal processors (DSPs), application-specific integrated circuits (ASICs), field programmable gate arrays (FPGAs), central processing units (CPUs), or the like. Example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. When implemented in software, a processor(s) may be programmed to perform the necessary tasks, thereby being transformed into special purpose processor(s) or computer(s).

Figure 2:
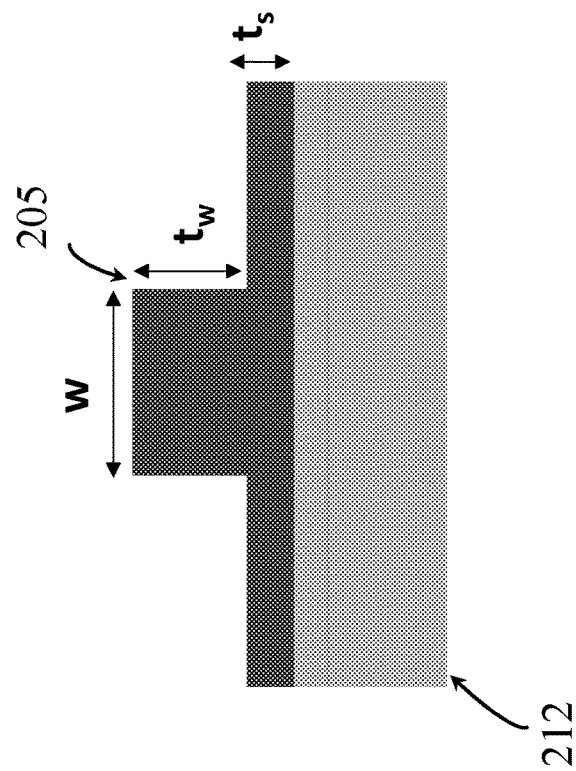
FIG. 2 shows a cross-sectional view of a waveguide in accordance with various embodiments described herein.

FIG. 1 shows a top-view schematic illustration 100 of an on-chip optical switch based on an echelle grating 115 and an active phase tuning element 110. The chip may be a photonic integrated circuit (PIC) comprising a plurality of photonic components such as an optical source (e.g., laser), interferometers, couplers, splitters, polarization rotators, waveguides (e.g., waveguides 105, and 130-133), the echelle grating 115, the phase tuning element 110, and/or fabricated on a silicon-on-insulator (SOI) wafer. Each component may be fabricated in the top silicon region 125. For example, the waveguides (105 and 130-133) may comprise a rib structure, as shown in FIG. 2, with the waveguiding portion being silicon and the insulator layer providing a supporting structure underneath. As another example, the echelle grating 115 may fabricated within the silicon region with a saw-tooth reflecting surface 120 fabricated by etching into the silicon region 125. The vertical facets of silicon termination may be covered by a metal film, such as an aluminum film varying between 20 nm and 300 nm in thickness to increase reflectivity of the reflecting surface 120. The phase tuning element 110 may be fabricated on top of the silicon layer 125, thereby positioning the phase tuning element 110 at a vertical offset (in the z-direction) from a horizontal (x y) plane of the photonic components and ensuring that the on-chip guided optical signals do not propagate through the phase tuning element 110. In some instances, a dielectric film varying between 200 nm and 1 μm may be deposited between the silicon region 405 and the phase tuning element. The dielectric film may be a silicon dioxide or silicon nitride film. The phase tuning element 110 may be positioned in the x-y plane along a direction of propagation of the optical signal emitted from the waveguide 105.

The coupling waveguides 130 to 133 may comprise an array of waveguides positioned along a circumference of a circle 130, also referred to as a Rowland circle. The input waveguide 105 may also be positioned along the circumference of the Rowland circle 130 that may have a radius $R_c$ varying between approximately 1 mm to 5 mm. The reflecting surface 120 of the echelle grating 115 may follow a curvature characterized by a radius, $R_g$, that is twice the radius of the Rowland circle, $R_c$.

Waveguide 105 may emit an optical signal that propagates towards the reflecting surface 120 of the echelle grating 115. When the phase tuning element 110 is OFF, the optical signal may propagate unperturbed towards point A on the surface 120 along an approximately straight path through the silicon region 125. The optical signal may then reflect-off the echelle grating 115 at an angle that directs the optical signal towards waveguide 130. When the phase tuning element 110 is ON, the index of the silicon region proximate to the phase tuning element 110 may change. This may cause the optical signal to deviate from the initial path and strike the surface 120 at a different position B. The optical signal may then reflect-off the echelle grating at a correspondingly different angle. As a result, the optical signal may couple into a different waveguide (e.g., waveguide 131, 132 or 133) depending on a net change in refractive index of the silicon due to the phase tuning element 110.

In some embodiments, the optical signal emitted from the waveguide 105 may be a laser signal from an on-chip or off-chip laser. The phase tuning element 110 may then be controlled to direct the laser signal to either one of the waveguides 130 to 133, effectively routing the laser signal to one of four corresponding optical paths that could be associated with scanning a targeted area sequentially or in some other desired sequence. While this embodiment describes routing the laser signal to one of four corresponding optical paths, the laser signal could be coupled to more than four optical paths depending upon a total number of coupling waveguides that an input optical signal can be switched between. This may depend on the speed of operation of the phase tuning element, the fabrication material(s) of the optical switch, frequency or wavelength of the optical signal, size of the various components including the waveguides, echelle grating, and the phase tuning element and positioning of the various components.

In another embodiment, the optical signal emitted from the waveguide 105 may be a returning LIDAR signal that was coupled into the PIC via one or more collimating and/or focusing optics. The phase tuning element 110 may then be controlled to direct the returning LIDAR signal to one of the waveguides 130 to 133 for further processing of scanned objects. This may allow the system to switch between different optical processing pathways respectively associated with each of the waveguides 130 to 133.

FIG. 2 shows a cross-section of the rib waveguides of FIG. 1 along line X-X' for example. A strip portion of the waveguides 105 and 130 to 133 may be configured with a width, w, and a height, $t_w$. The width, w, may vary between approximately 1.5 μm and 2 μm and the height, $t_w$, may vary between approximately 1 μm and 1.5 μm. The height of the remaining slab portion of the waveguides, $t_s$, may depend on wafer specifications and/or fabrication processes. For example, the height of the slab portion is may be approximately 1.8 μm. In some instances, the rib waveguide may be a silicon rib waveguide 205 with an underlying buried oxide (BOX) layer 212. The supporting wafer structure 212 may comprise height that varies between 1 μm and 1.5 μm.

Figure 3:
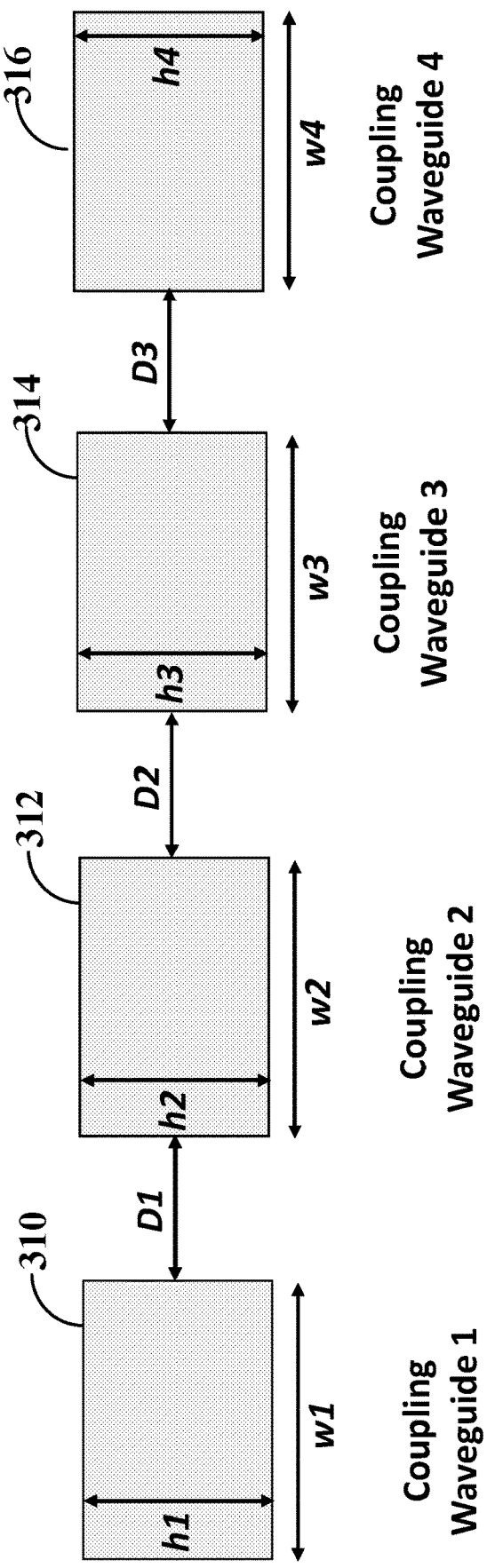
FIG. 3 shows a cross-section view of an array of coupling waveguides in accordance with various embodiments described herein.

FIG. 3 shows a cross-sectional view 300 of the strip portion of the coupling waveguides described earlier with respect to FIGS. 1 and 2 along line Y-Y'. Spacing between each of the coupling waveguides may depend upon a type of application, such as multiplexing and demultiplexing. In some embodiments, each of the coupling waveguides may be positioned as close to an adjacent one of the coupling waveguides with the spacing limited by fabrication process nodes. For example, each of the coupling waveguides may be spaced apart by approximately 3 μm center-to-center. In some embodiments, the spacing between each of the coupling waveguides (D1, D2, and D3) may be different. Although the width, w, and the height, $t_w$, of the strip portions of the coupling waveguides may be similar, as described above in FIG. 2, in some alternative embodiments each of the coupling waveguides may be characterized by a corresponding width (w1, w2, and w3) and a corresponding height (h1, h2, and h3). The height of the remaining slab portion of the coupling waveguides may then depend on the corresponding height of the strip portion and/or the fabrication process.

Figure 4:
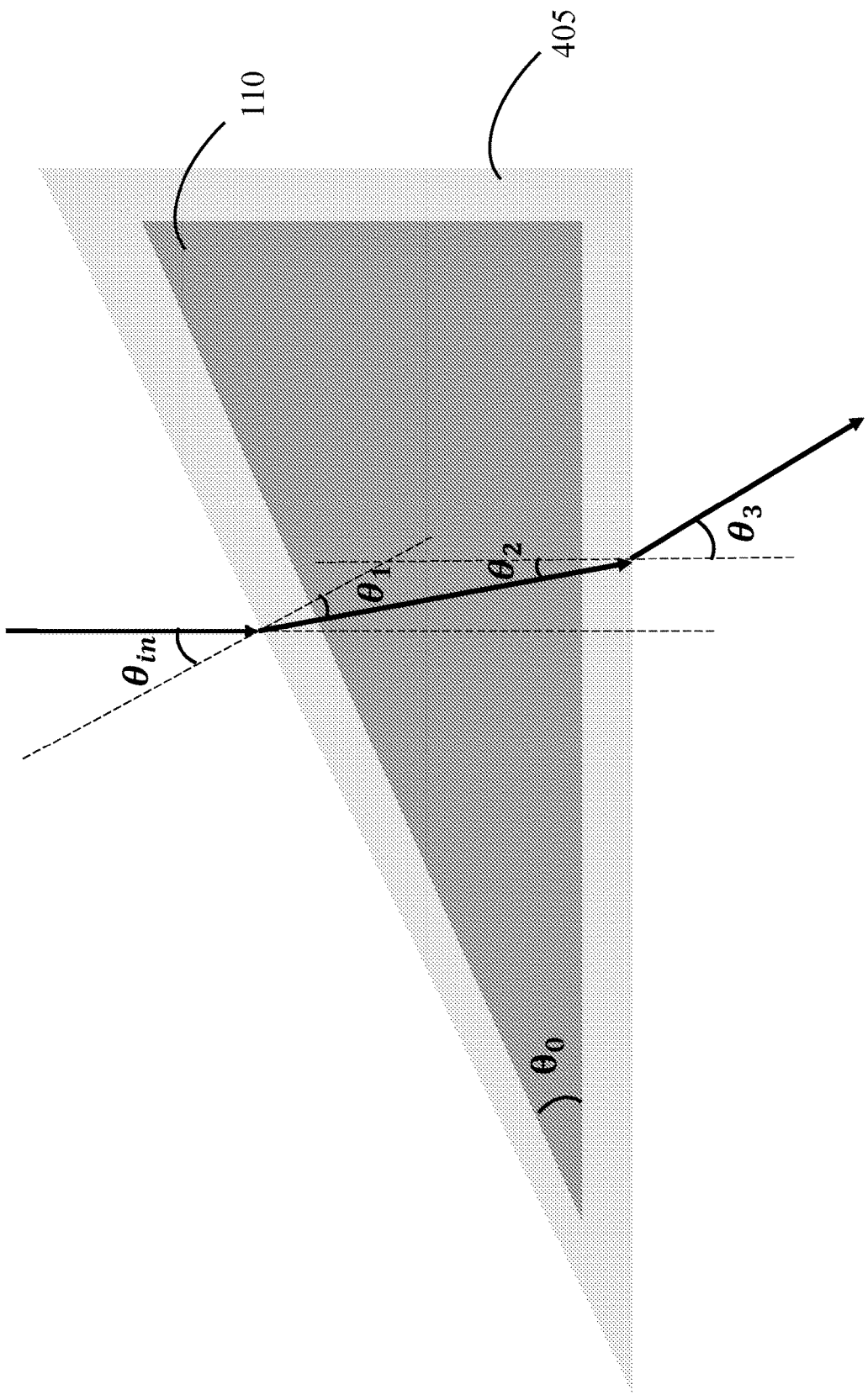
FIG. 4 shows a cross-sectional view of a phase tuning element of the on-chip optical switch in accordance with various embodiments described herein.

FIG. 4 shows an example illustration 400 of light propagation through the silicon region 405 located directly below the phase tuning element 110 (darker shaded region). For example, the phase tuning element 110 may be a heating element shaped like a prism. When the heating element is turned ON, the heat propagation into the underlying silicon 125 will cause an index change in a silicon region 405 that resembles the footprint of the heating element 110 that is positioned directly above and in contact with, the silicon region 125. The optical signal propagating through the silicon region 125 may then encounter the index-changed silicon region 305 and undergo refraction at each edge of the index-changed silicon 405. The optical signal may then continue to propagate through the remaining silicon region 125 on an altered path characterized by angle $\theta_3$ given by sin $$\theta_3 = \frac{n \sin \theta_2}{\theta_0} \text{ and } \theta_2 = (\theta_{in} - \theta_1),$$

where $\theta_{in}$ is the angle of incidence of the optical signal.

While the geometrical shape of the phase tuning element 110 shown is associated with a prism, other shapes may also be used for the phase tuning element 110. In some instances, the phase tuning element 110 may be a prism with an interior angle $\theta_0$. For example, the phase tuning element 110 may be an equilateral prism. In some embodiments, the optical signal may impinge on the index-changed silicon region at an angle $\theta_m$ that is at 90 degrees to the base of the prism-shaped index-changed silicon region 305. If $\theta_0$=60 degrees and the temperature change is approximately 30 degrees Celsius, $\theta_3$ may equal approximately 0.16 degrees. The angular change of approximately 0.1 degrees to 0.3 degrees in the wavefront of the optical signal may be sufficient to alter the path of the optical signal from waveguide 130 to 133. Further design optimizations may allow for optical switching across more than four channels associated with the arrayed waveguides 130 to 133. For example, use of different materials that can cause a greater index change in the region through which the optical signal propagates may enable optical switching across at least six channels associated with six different coupling waveguides.

Figure 5:
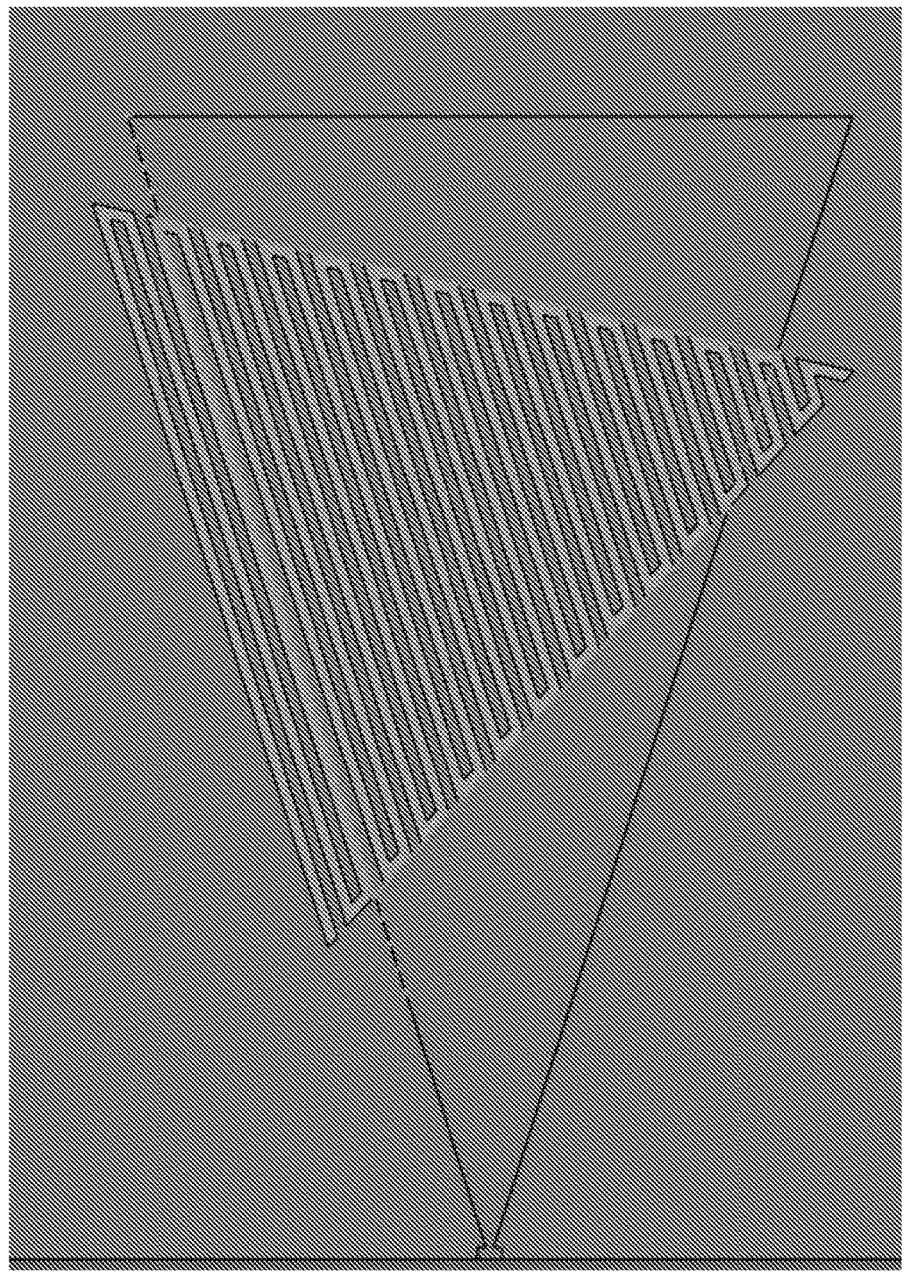
FIG. 5 shows an example of a phase tuning element in accordance with various embodiments described herein.

FIG. 5 shows a schematic illustration of a heating element as the phase tuning element 110. The heating element may be serpentine with an equilateral shape. The heating element may be made of titanium nitride (TiN) or any other suitable material. The width of the serpentine coil may be a couple hundred nanometers up to 500 nm. For example, the width may be 300 nm. The overall dimensions of the equilateral shape may vary between 100 μm and 1 mm. The power consumption of the heating element may depend on the size and the material.

Figure 6:
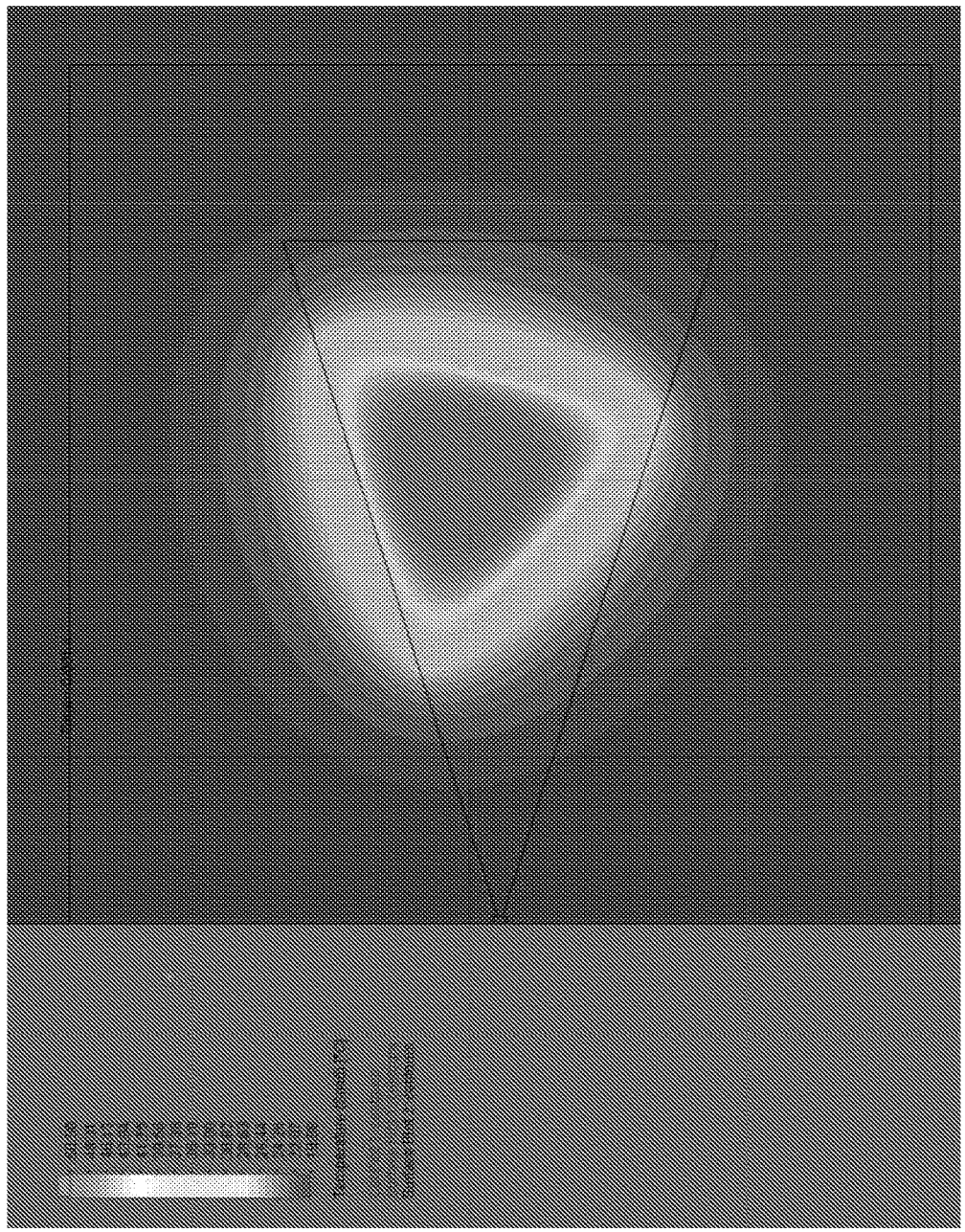
FIG. 6 shows a thermal simulation plot for the phase tuning element of FIG. 4 in accordance with various embodiments described herein.

FIG. 6 shows a heatmap of the silicon surface region in contact with and/or proximate to the TiN heating element of FIG. 5. A near uniform temperature of around 50 degrees Celsius is seen over an equilateral triangular area that gradually reduces to near 20 degrees Celsius away from the heating element.

Figure 7:
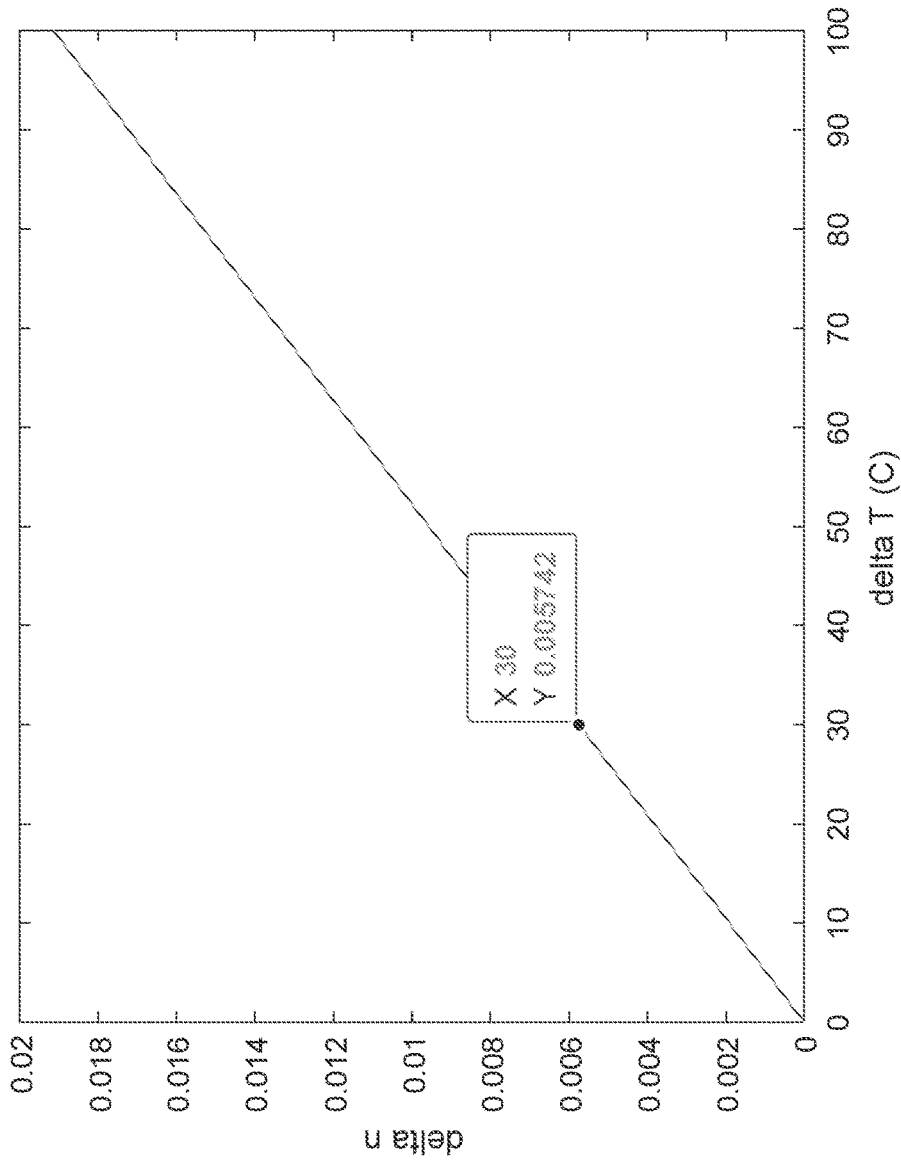
FIG. 7 shows a plot of a change in the refractive index of silicon versus a change in the temperature of the phase tuning element of FIG. 4 in accordance with various embodiments described herein.

FIG. 7 shows a plot of the change in refractive index (Δn) of the silicon region 405 that lies directly below the heating element of FIG. 5 with a change in the temperature (ΔT) of the silicon region 405. As the net change in temperature increases, the change in the refractive index of silicon is seen to increase in a nearly linear manner. For example, an approximately 30 degrees Celsius change in temperature of the silicon region 405 may cause the refractive index of the silicon region 405 to change by 0.0057. By dynamically controlling the heating element, the index of the silicon region 405 may be perturbed to control the angle at which the optical signal reflects-off the reflecting surface 120 of the echelle grating. This in turn allows for control over which waveguide out of the coupling waveguides 130 to 133 the optical signal is directed to. The speed of operation of the optical switch based on the echelle grating 115 and the phase tuning element 110 may be proportional to the speed at which the index of the silicon region 405 may be changed. A faster heating and/or cooling cycle may be dependent on the heat dissipation constant of the silicon region 405 as well as the speed of operation of the phase tuning element 110.

Figure 8:
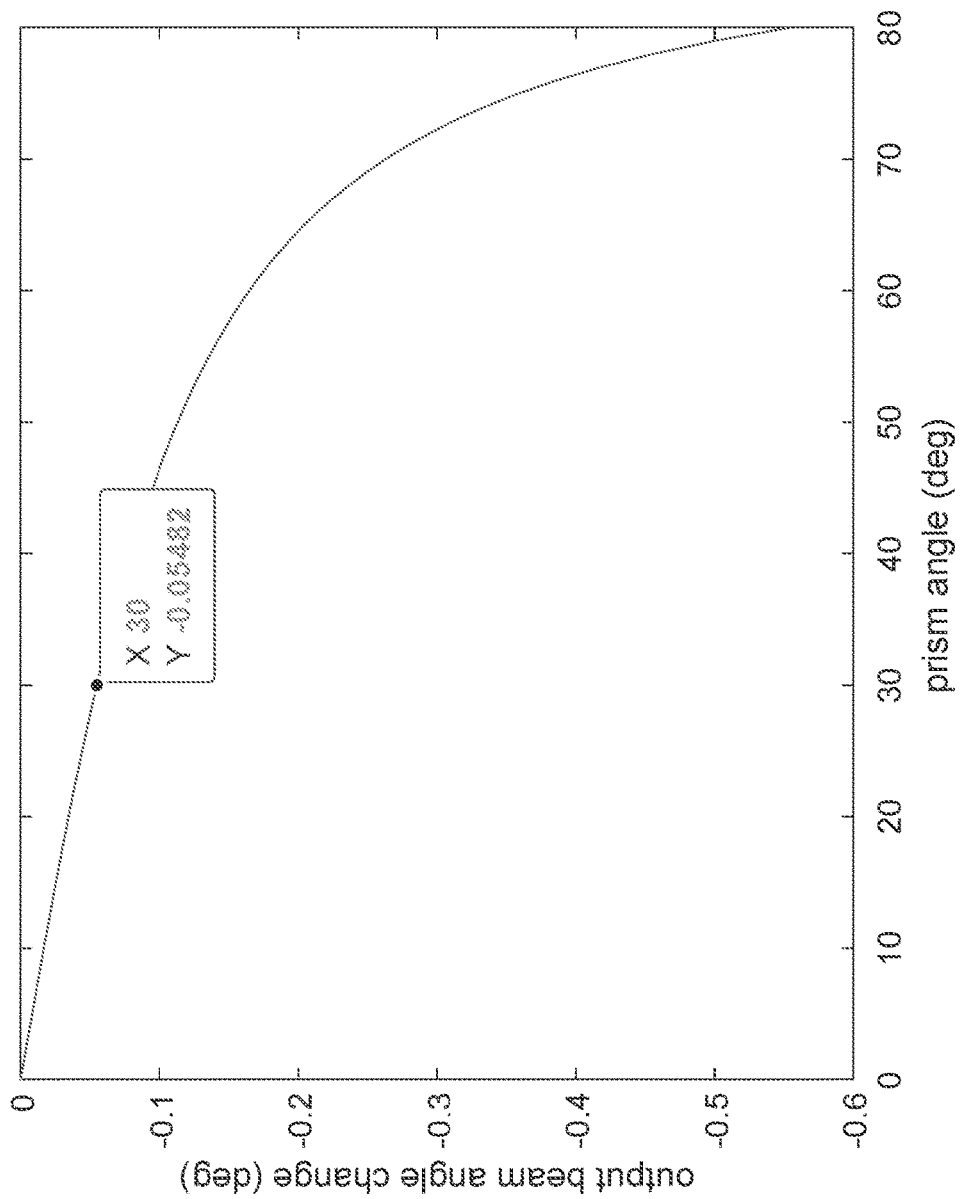
FIG. 8 shows a plot of angle of reflection-off the echelle grating versus an interior angle of the phase tuning element in accordance with various embodiments described herein.
Figure 9:
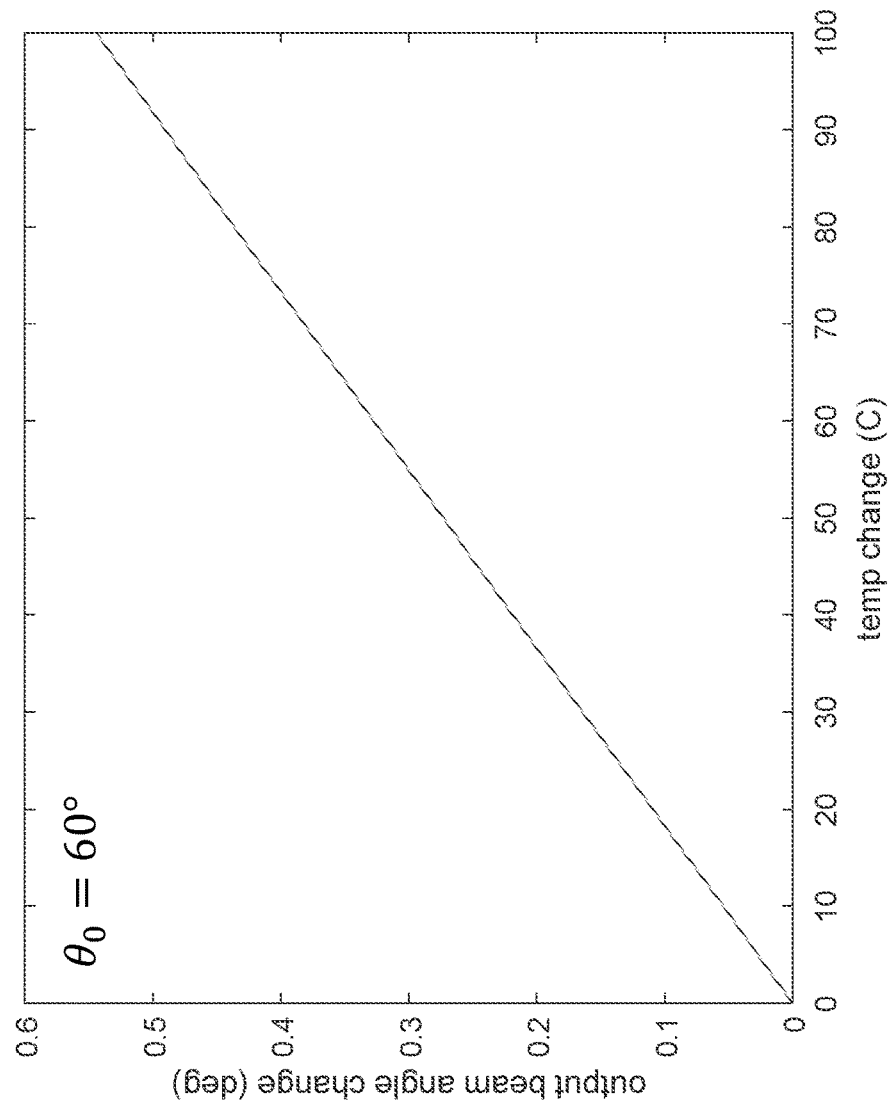
FIG. 9 shows a plot of change in the output angle of an optical signal with a change in temperature associated with the on-chip optical switch of FIG. 1 in accordance with various embodiments described herein.

FIG. 8 shows a plot of output beam angle versus an interior angle of the prism-shaped phase tuning element 110. The output beam angle may correspond to $\theta_3$ of FIG. 4 and the interior angle of the phase tuning element 110 may correspond to $\theta_0$ of FIG. 4. As the interior angle $\theta_0$ increases, the output beam angle $\theta_3$ is seen to increase. FIG. 9 shows a plot of the output beam angle $\theta_3$ versus change in temperature (ΔT) associated with the silicon region 405 and for a prism-shaped heating element with $\theta_0$ approximately equal to 60 degrees. As the temperature change (ΔT) associated with the silicon region 405 increases, the output beam angle is seen to increase in a near linear manner. By dynamically controlling the heating element, the temperature change (ΔT) may be controlled to select a desired output beam angle that respectively corresponds to the optical signal being directed to one of the coupling waveguides 130 to 133.

Figure 10:
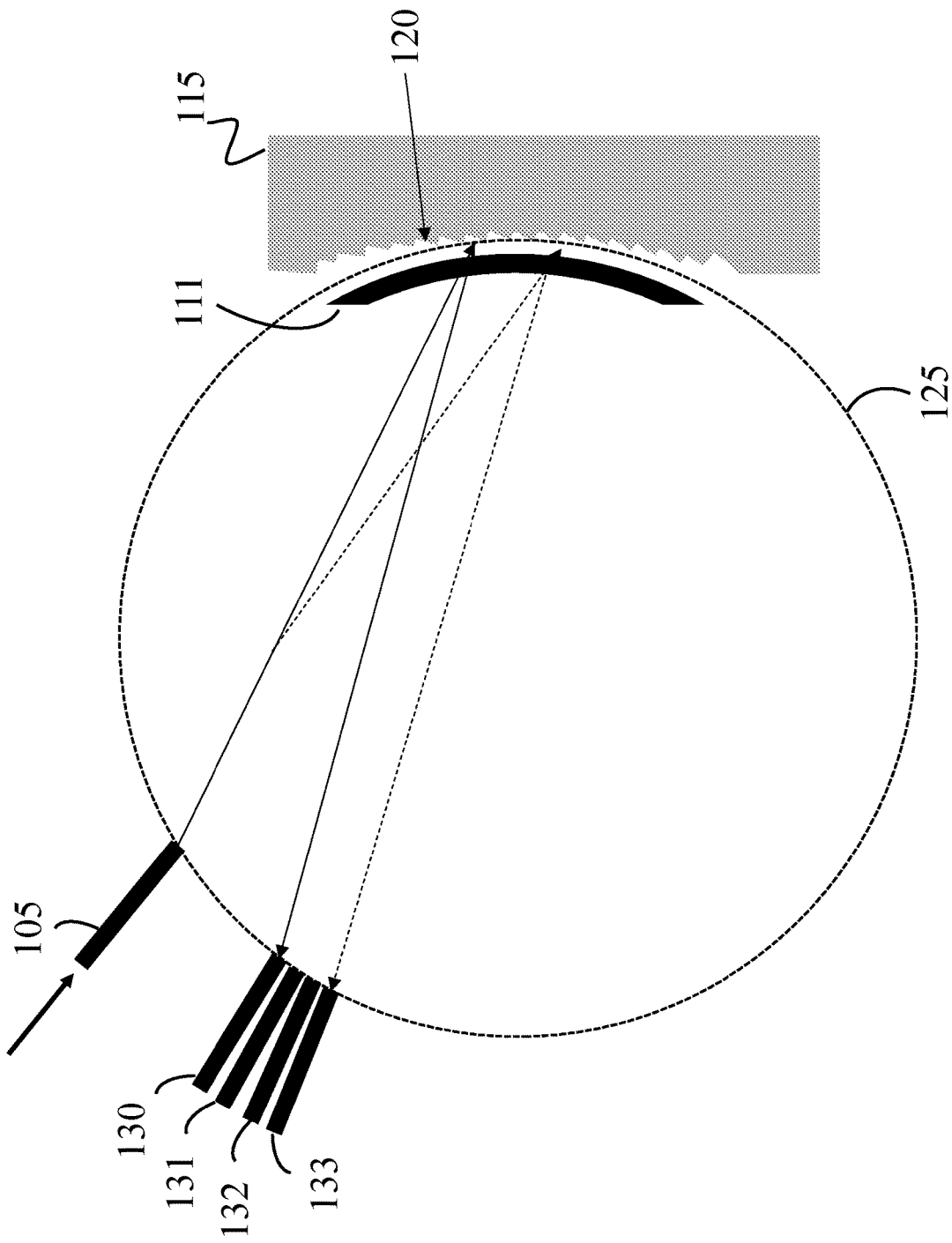
FIG. 10 shows another schematic illustration of on-chip optical switch based on an echelle grating and a circularly shaped phase tuning element in accordance with various embodiments described herein.

FIG. 10 shows an alternative embodiment of the optical switch 100 described earlier with respect to FIG. 1 in which the phase tuning element 111 is positioned close to the echelle grating 115 and is based on a semi-circular shape. In this embodiment, the phase tuning element 111 can be configured to change the refractive index of the underlying silicon region that may be in contact with the phase tuning element 111 and near the echelle grating. The change in the refractive index of the silicon region may be proportional to a path difference arising from the saw-tooth like reflecting surface 120 that may be approximately equal to a periodic distance between each of the saw-tooth features on the echelle grating.

Figure 11:
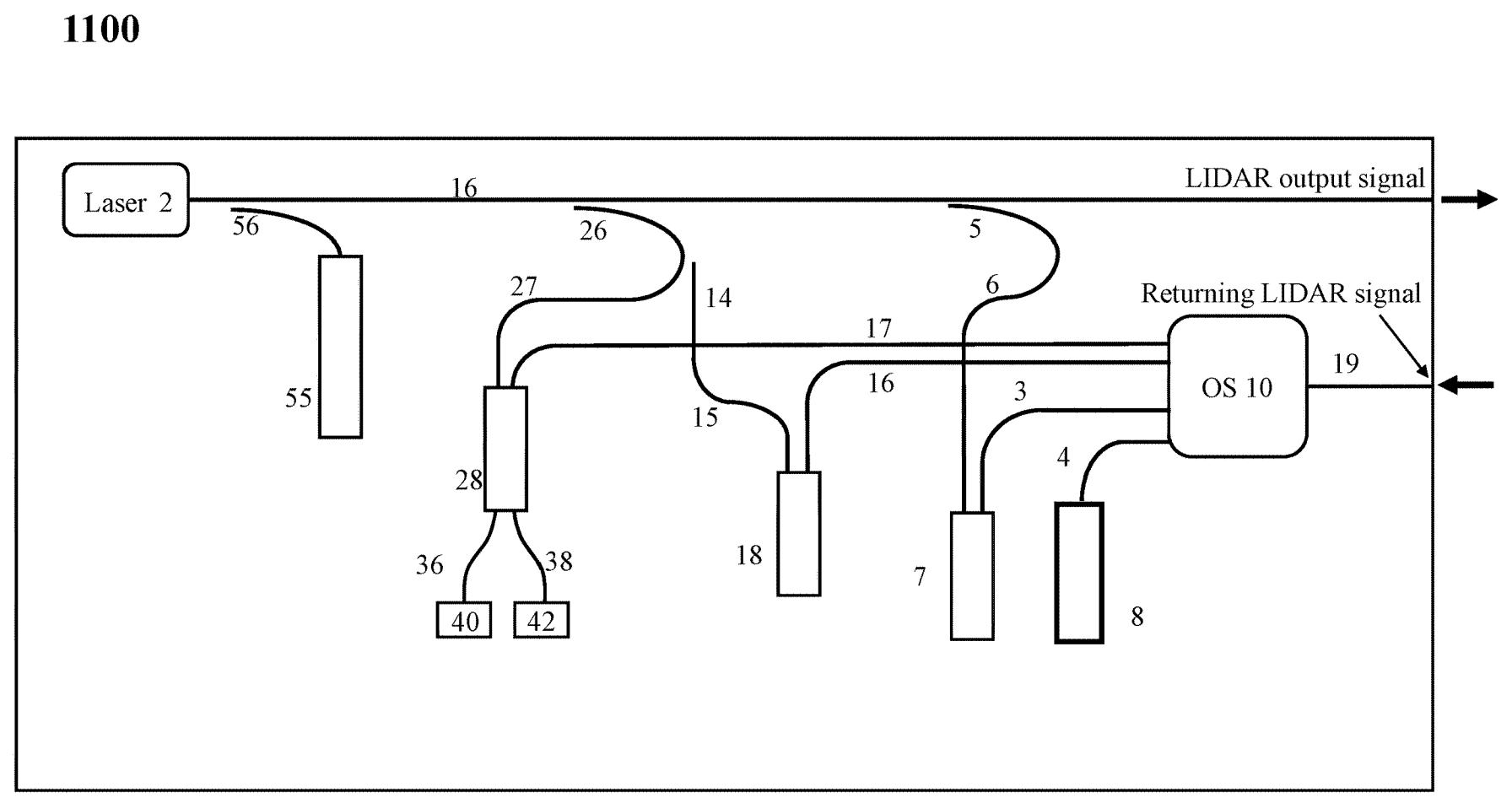

FIG. 11 shows a top view of a LIDAR chip 1000 incorporating optical switching for returning LIDAR signals. The chip may include a multiple input waveguide configuration with each waveguide respectively corresponding to a particular polarization state of an incoming LIDAR signal. The LIDAR chip may include a light source 2 (e.g., laser) and a plurality of photonic components such as, an output waveguide 16, an input waveguide 19 that couples into an optical switch (e.g., the optical switch of FIG. 1), light-combining components (28, 18, 7 and 8), and splitters (56, 26 and 5). In some instances, the light source may be off-chip. For a TE-polarized laser source, a polarization rotator may be used to convert the TE-polarized light into TM-polarized light either in an off-chip or on-chip configuration with the laser correspondingly located either located off-chip or on-chip.

In some instances, the LIDAR chip may include pairs of light sensors (e.g., 40 and 42) with each pair arranged in a balanced photodetector configuration. Each pair of light sensors can convert the respective optical beat signal from the corresponding light-combining component into an electrical beat signal. The electrical beat signals may be transmitted from the light sensor pairs to off-chip processing circuits via electrical signal lines (not shown) that each terminate at an edge of the chip.

The input waveguide 19 may be positioned away from the output waveguide 16 by a first predetermined distance (D1). In some embodiments, the first predetermined distance may vary between 50 nm and 10 μm. Various parameters may affect a selection of D1 including at least one of the range of operation (e.g., short-range<10 m, mid-range 10 m up to 50 m, and long-range>50 m), the wavelength range of operation (e.g., 1200 nm to 1320 nm, 1400 nm to 1590 nm, and 1900 to 7050 nm), the chirp duration, the chirp rate, the scanning module 106 parameters, specifications of the lens and/or collimators used to focus the optical signals (e.g., the LIDAR output signal, the first LIDAR input signal, and the second LIDAR input signal) to-and-from the LIDAR chip.

The output waveguide 16 may couple light from the laser 2. The coupled laser light may be transmitted to an output facet via the output waveguide that terminates at the output facet. The laser light emitted from the output facet may be referred to as the outgoing LIDAR signal or the LIDAR output signal interchangeably. The output facet may be positioned at an edge of the LIDAR chip. The output facet may be referred to as a terminating facet associated with the output waveguide 16. The LIDAR chip of FIG. 10 may be associated with the LIDAR chips described in related applications bearing application Ser. Nos. 16/931,444 and 17/062,618 disclosed herein in their entirety. The LIDAR input signal may be switched between different waveguides that are respectively connected to corresponding processing circuitry by using the optical switch 10 that may be based on the optical switch configurations described earlier with respect to FIGS. 1-10. The input waveguide 19 may be similar to the coupling waveguide 105 of FIG. 1 or 10. Each of the waveguides 17, 16, 3, and 4 may correspond to one of the arrayed waveguides described earlier with respect to FIGS. 1 and 10 and the returning LIDAR signal may be switched between the waveguides 17, 16, 3, and 4.

In some embodiments, the LIDAR chip may include an amplifier positioned along the output path of the LIDAR output signal and before the output facet. For example, the output waveguide 16 may carry the LIDAR output signal to the amplifier and an amplified LIDAR output signal may then exit the LIDAR chip from the output facet. Electronics (not shown) may be configured to control the amplifier operation and/or control a power of the LIDAR output signal. Examples of amplifiers include, but are not limited to, Erbium-doped fiber amplifiers (EDFAs), Erbium-doped waveguide amplifiers (EDWAs), and Semiconductor Optical Amplifiers (SOAs). In some embodiments, the amplifier may be a discrete component that is attached to the chip. The discrete amplifier may be positioned at any location on the LIDAR chip along the path of the LIDAR output signal. In some embodiments, all or a portion of the amplifier may be fabricated as along with the LIDAR chip as an integrated on-chip component. The LIDAR chip may be fabricated from various substrate materials including, but not limited to, silicon dioxide, indium phosphide, and silicon-on-insulator (SOI) wafers. Examples of splitters 56, 26 and 5 include, but are not limited to, y-junctions, optical couplers, and MMIs.

In some embodiments, optics, such as birefringent crystals, polarization splitters, polarization rotators, lenses, collimator(s), and/or mirror(s) may be positioned off-chip. A scanning module may be used to steer the incoming and/or outgoing LIDAR optical signals. The light-combining components may include multi-mode interference devices (MMIs), adiabatic splitters, and/or directional couplers. In some embodiments, the light-combining components may be 2×2 MMI devices. The functions of the illustrated light-combining components may be performed by more than one optical component.

The splitter 56 may be positioned sufficiently close to the output waveguide 16 to enabling coupling of light from the output waveguide 16 into the reference waveguide 56. The portion of the laser signal transmitted to the reference waveguide may be referred to as a reference signal. A reference waveguide 27 may carry a second reference signal to a second light-combining component 18 and so on.

In some embodiments, there may be a phase shift (e.g, 0 to π) between output light signals of a first arm and a second arm of each of the MMIs. The output light signals associated with the two arms of the first MMI may be referred to as a first composite signal and a second composite signal, wherein the first and the second composite signals including portions of the first LIDAR input signal and portions of the reference signal. The output light signals associated with the two arms of the second MMI may be referred to as a third composite signal and a fourth composite signal, wherein the third and the fourth composite signals including portions of the second LIDAR input signal and portions of the second reference signal.

The first composite signal may couple into a first detector waveguide 36 and the second composite signal may couple into a second detector waveguide 38. The first detector waveguide may then transmit the first composite signal to a first light sensor 40 and the second detector waveguide may transmit the second composite signal to the second light sensor 42. Similarly, light-components 18, 7 and 8 may also couple into corresponding detector waveguide pairs that each terminate at a corresponding light sensor (not shown).

Each light sensor may then convert the corresponding composite optical signal into a respective electrical signal. For example, the first light sensor 40 may then convert the first composite signal into a first electrical signal. As another example, the second light sensor 42 may convert the second composite signal into a second electrical signal. As such, the first light sensor and the second light sensor respectively convert the first composite signal and the second composite signal into photodetector currents that vary in time. Examples of the light sensors include photodiodes (PDs), and avalanche photodiodes (APDs).

The LIDAR chip can include a control branch (not shown) for controlling operation of the laser 2. The control branch may include a directional coupler that can couple a portion of the laser output from the output waveguide 16 into a control waveguide. The coupled portion of the laser output transmitted via the control waveguide can serve as a tapped signal. In some embodiments, other signal-tapping photonic components, such as y-junctions and/or MMIs, may be used in place of the directional coupler.

The control waveguide can carry the tapped laser signal to a control interferometer that splits the tapped signal and then re-combines different portions of the tapped signal that are respectively offset in phase with respect to each other. The control interferometer may be a Mach-Zhender interferometer (MZI) comprising two unequal arms along which the split-up portions of the input signal travel before re-combining (e.g., interfering) towards the end; however, other interferometer configurations may be used. The control interferometer signal output may be characterized by an intensity that is largely a function of the frequency of the tapped laser output. For example, the MZI may output a sinusoidal signal characterized by a fringe pattern.

The sinusoidal signal from the control interferometer can couple into an interferometer waveguide and can function as an input to a control light sensor. The control light sensor may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor is a function of the frequency of the LIDAR output signal. Other detection mechanisms can be used in place of the control light sensor.

Electronics (not shown) can operate one or more components on the chip. For instance, the electronics can be in electrical communication with and control operation of the laser 705, the light sensors, and the control light sensor. All or a portion of the electronics can be included on the chip. For instance, the chip can include electrical conductors that connect the first light sensor 40 in series with the second light sensor 42.

In some embodiments, the electronics may control the chirp frequency and/or the chirp duration of the LIDAR output signal. A measurement duration may correspond to one or more chirp durations. Each measurement duration may be referred to as a data cycle. LIDAR data can be generated for each (radial distance and/or radial velocity between the LIDAR system and a reflecting object) data cycle. For example, one data cycle may correspond to two chirp durations effectively encompassing an up-ramp chirp duration and a down-ramp chirp duration. As another example, one data cycle may correspond to three chirp durations effectively encompassing an up-ramp, a down-ramp and another up-ramp chirp duration. During each data period, the electronics may tune the chirp frequency of the LIDAR output signal. For example, during a first chirp duration, the electronics may increase the frequency of the LIDAR output signal and during a second chirp duration the electronics may decrease the frequency of the LIDAR output signal or vice versa.

When the LIDAR output signal frequency is increased during the first chirp duration, the signal travels away from the LIDAR chip and an object positioned in a sample region of a field of view may reflect light from the LIDAR output signal. At least a portion of the reflected light is then returned to the chip via one or more LIDAR input signals. During the time that the LIDAR output signal and the one or more LIDAR input signals are traveling between the chip and the reflecting object, the frequency of the LIDAR output signal exiting the output facet may continue to increase. Since a portion of the output signal is tapped as the first TM reference signal, the frequency of the first TM reference signal continues to increase. As a result, a LIDAR input signal enters the light-combining component 28 with a lower frequency than the first TM reference signal concurrently entering the light-combining component. Additionally, the further the reflecting object is located from the chip, the more the frequency of the first TM reference signal increases before a LIDAR input signal returns to the chip because the further the reflecting object is located, the greater will be the round-trip delay associated with the LIDAR imaging signal. Accordingly, the larger the difference between the frequency of the LIDAR input signal and the frequency of the first TM reference signal, the further the reflecting object is from the chip. As a result, the difference between the frequency of the LIDAR input signal transmitted via waveguide 16 and the frequency of the first reference signal is a function of the distance between the chip and the reflecting object.

Each of the composite signals may be based on interference between the respective LIDAR input signal and the corresponding reference signal within the corresponding light-combining component. A higher beat frequency for the corresponding composite signal indicates a higher differential between the frequencies of the corresponding LIDAR input signal and the corresponding reference signal. As a result, the beat frequency of the data signal is a function of the distance and/or radial velocity between the LIDAR system and the reflecting object.

The beat frequencies ($f_{LDP}$) from two or more data periods or chirp durations may be combined to generate LIDAR data that may include frequency domain information, distance and/or radial velocity information associated with the reflecting object. For example, a first beat frequency that the electronics determine from a first data period ($DP_1$) can be combined with a second beat frequency that the electronics determine from a second data period ($DP_2$) to determine a distance of the reflecting object from the LIDAR system and in some embodiments, a relative velocity between the reflecting object and the LIDAR system.

Figure 12:
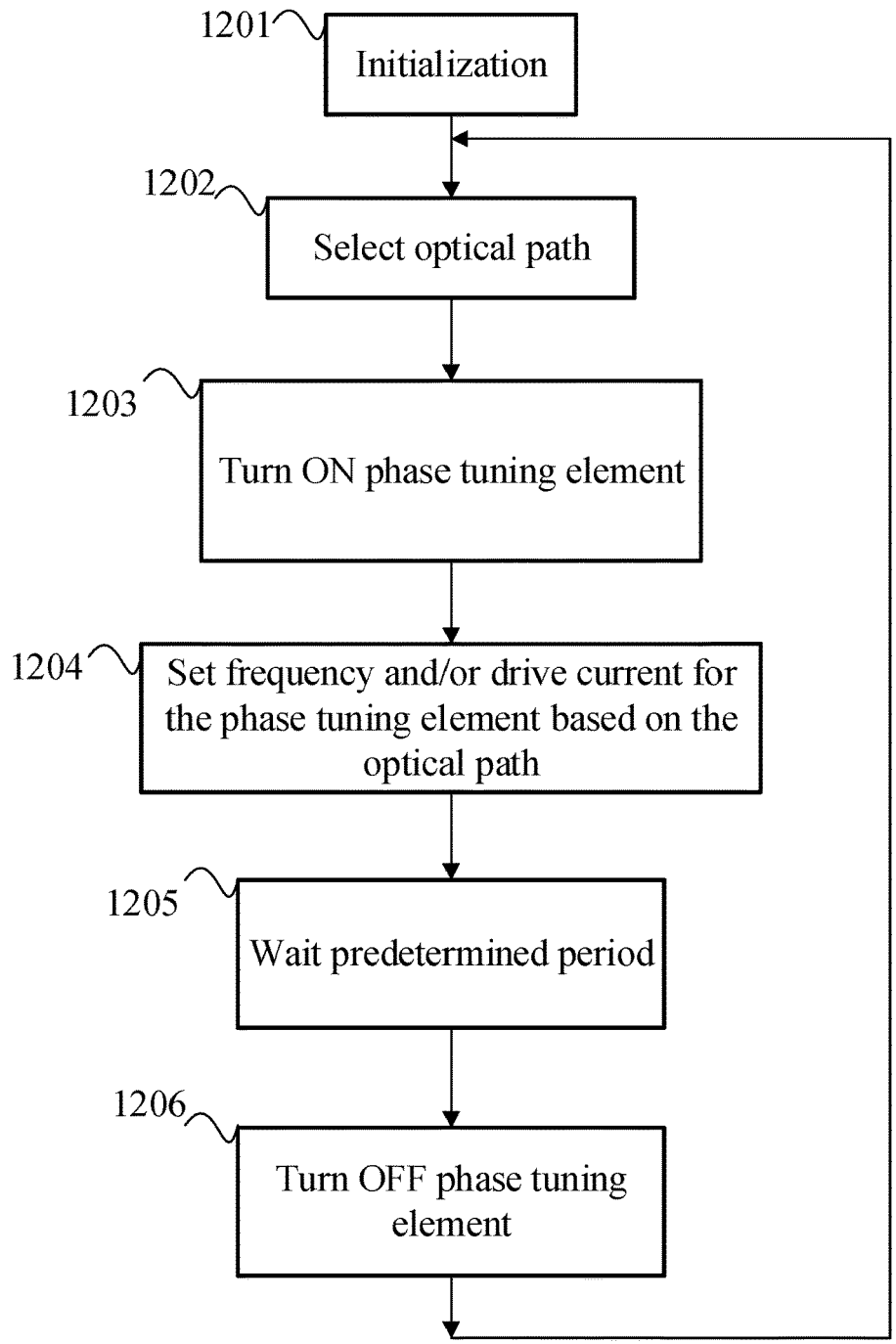
FIG. 12 shows an exemplary flowchart associated with an operation of an on-chip optical switch in accordance with various embodiments described herein.

FIG. 12 shows an exemplary flowchart associated with an operation of the optical switch 100. At 1201, various parameters associated with the control of the phase tuning element may be initialized such as drive current, output power levels, and/or switching speeds. In some embodiments, if the optical switch is part of a LiDAR system, the initialization may include chirp durations, data cycles, sampling frequencies, chirp rates, chirp bandwidths, laser linearization parameters, and/or lasing frequencies of the outgoing LiDAR signal. The linearization parameters may vary from one chirp duration to the next or across between two or more chirp durations. In some embodiments, the linearization parameters may vary from one data cycle to the next data cycle. The system may initialize some parameters based on a range of operation of the LiDAR system. For example, some of the parameters may be different for short range (less than 20 m), medium range (up to 50 m). and long range (greater than or equal to 50 m) of operation of the LiDAR system.

At 1202, one of the optical paths connected to a corresponding one of the coupling waveguides of the optical switch may be selected depending upon overall signal processing requirements. For example, a first optical path may be selected, wherein the first optical path is connected to a first coupling waveguide out of an array of four coupling waveguides. In some instances, selection of the optical paths, and thus the corresponding coupling waveguide, may follow a predetermined sequence.

At 1203, the phase tuning element may be turned ON. A frequency and/or drive current for the phase tuning element based on the selected optical path may be set at 1204. The phase tuning element may be controlled to cause a predetermined index change in the underlying silicon region that can direct the optical signal to the selected coupling waveguide associated with the selected optical path. For example, the phase tuning element may be controlled to cause the optical signal to be directed towards the first coupling waveguide.

At 1205, a control system may wait for a predetermined period of time depending on a transmission period of the optical signal through the selected optical path. For example, if the optical signal is switched to the first optical path associated with the first coupling waveguide, the system may wait for a certain time duration to ensure that the optical signal has been transmitted to the first optical path for a sufficient period of time. This duration may depend on the application type. The system may then turn OFF the phase tuning element at 1206 that may cause the optical signal to revert back to its initial propagation direction and couple to another one of the coupling waveguides.

In some embodiments, instead of turning OFF the phase tuning element, the control system may dynamically adjust the settings of the phase tuning element to direct the optical signal to another optical path associated with another one of the coupling waveguides. For example, the control system may select another one of the optical signal processing paths respectively associated with another one of the coupling waveguides at 1202. In this manner, the control system may be able to selectively switch the optical signal between at least two different coupling waveguides that are respectively associated with two different optical signal processing paths.

Although the control system is disclosed in the context of an on-chip optical switch, the system can be used in other applications such as machine learning, data analytics, autonomous vehicle technology, remote sensing, machine vision, and data communications.

The above-described control system may be associated with instructions recorded in non-transitory computer-readable media to implement various operations embodied by a processing system. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer readable media may also be a distributed network, so that the program instructions are stored and executed in a distributed fashion. The program instructions may be executed by one or more processors or computational elements. The non-transitory computer readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

The invention claimed is:

1. A method of operating an on-chip optical switch, comprising:
   directing an optical signal from an input waveguide towards a reflecting surface included in an echelle grating, the optical signal being directed towards the reflecting surface such that the optical signal can travel one of multiple different paths,
   each of the different paths extending from the input waveguide to the reflecting surface and then to a different one of multiple coupling waveguides; and
   operating a phase tuner so as to tune an index of refraction of the paths such that the path traveled by the optical signal changes in response to a level of a change in the index of refraction provided by the tuning.

2. The method of claim 1, wherein the input waveguide, the echelle grating, and the array of coupling waveguides are fabricated in a top silicon layer of a silicon-on-insulator wafer.

3. The method of claim 2, wherein the phase tuner is on top of the silicon layer such that phase tuner has a vertical offset from a horizontal plane containing the input waveguide, the echelle grating, and the array of coupling waveguides.

4. The method of claim 1, wherein operating the phase tuner so as to tune the index of refraction of the paths includes tuning the index of refraction of a region of the chip that is prism-shaped and has at least one interior angle of approximately 60 degrees.

5. The method of claim 1, wherein the phase tuner comprises a serpentine heating element in the shape of an equilateral triangle.

6. The method of claim 1, wherein the input waveguide and each of the coupling waveguides is a rib waveguide positioned along a perimeter of a Rowland circle and operating the phase tuner so as to tune the index of refraction of the paths includes tuning the index of refraction of a region of the Rowland circle.

7. The method of claim 6, wherein the reflecting surface of the echelle grating is positioned along the perimeter of the Rowland circle, and wherein the reflecting surface is configured to reflect the optical signal towards at least one of the coupling waveguides.

8. The method of claim 6, wherein a radius of curvature associated with the reflecting surface of the echelle grating is approximately twice a radius of curvature of the Rowland circle.

9. The method of claim 6, wherein operating the phase tuner so as to tune the index of refraction of the paths includes heating a region of the Rowland circle.

10. The method of claim 1, wherein the paths extend through a Rowland circle.

11. The method of claim 10, wherein the phase tuner is positioned over the Rowland circle.

\* \* \* \* \*